(12) United States Patent
Dünki et al.

(10) Patent No.: US 12,070,149 B2
(45) Date of Patent: Aug. 27, 2024

(54) DRINKS PREPARATION MACHINE

(71) Applicant: Tchibo GmbH, Hamburg (DE)

(72) Inventors: Christian Dünki, Au (CH); Patrik Naeff, Thal (CH)

(73) Assignee: TCHIBO GMBH, Hamburg (DE)

( * ) Notice: Subject to any disclaimer, the term of this patent is extended or adjusted under 35 U.S.C. 154(b) by 632 days.

(21) Appl. No.: 17/285,545

(22) PCT Filed: Oct. 17, 2019

(86) PCT No.: PCT/EP2019/078291
§ 371 (c)(1),
(2) Date: Apr. 15, 2021

(87) PCT Pub. No.: WO2020/079191
PCT Pub. Date: Apr. 23, 2020

(65) Prior Publication Data
US 2021/0378438 A1  Dec. 9, 2021

(30) Foreign Application Priority Data
Oct. 18, 2018 (EP) .................................... 18201280

(51) Int. Cl.
| | |
|---|---|
| *A47J 31/40* | (2006.01) |
| *A23F 5/26* | (2006.01) |
| *A47J 31/46* | (2006.01) |
| *A47J 31/52* | (2006.01) |

(52) U.S. Cl.
CPC ............ *A47J 31/407* (2013.01); *A23F 5/262* (2013.01); *A47J 31/468* (2018.08); *A47J 31/521* (2018.08); *A47J 31/5255* (2018.08)

(58) Field of Classification Search
CPC .... A47J 31/407; A47J 31/521; A47J 31/5255; A47J 31/468; A23F 5/262
USPC ........................................................ 426/232
See application file for complete search history.

(56) References Cited

FOREIGN PATENT DOCUMENTS

| | | |
|---|---|---|
| CN | 105813519 A | 7/2016 |
| EP | 2 946 702 | 11/2015 |
| EP | 2946702 A1 * | 11/2015 ............... A23F 5/26 |

OTHER PUBLICATIONS

English translation of Chinese Office Action dated Aug. 9, 2022 issued in corresponding application No. 201980067234.9; 11 pages.

* cited by examiner

*Primary Examiner* — Brent T O'Hern
(74) *Attorney, Agent, or Firm* — Rankin, Hill & Clark LLP

(57) ABSTRACT

The drinks preparation machine includes a pump for delivering the preparation fluid—generally water—into a brewing chamber, which receives the portion package, as well as a flow-meter for measuring the fluid flow into the brewing chamber. Machine electronics activate the pump and acquire the results of flow rate measurement, in order for example to switch off the pump after reaching a defined delivered fluid quantity. The electronics are configured to evaluate the measured flow rate and from this evaluation to make a differentiation between a first state "brewing with an inserted portion package" and a second state "water through-flow without inserted portion package", in order to detect the presence of a portion package in the brewing chamber.

11 Claims, 2 Drawing Sheets

DRINKS PREPARATION MACHINE

BACKGROUND OF THE INVENTION

Description of Related Art

The invention relates to drinks preparation machines for preparing drinks or the like from portion packages which are formed by an extraction material which is contained in a portion package.

Description of Related Art

Extraction devices for preparing drinks or the like from an extraction material which is present in a portion package, for example ground coffee or tea leaves, are known for example as coffee machines or espresso machines or tea preparation machines. Capsules, but also so-called pads or pods are known as portion packages.

It is already known to provide portion packages with a code, which is read out by a recognition module of the coffee machine, which is configured for this, for example in order to fashion the brewing, which is carried out subsequently to the read-out in a manner depending on the type of the recognised portion package. Apart from the advantage of the possible brewing parameter selection, which is dependent on the type, the capsule recognition (which is to say the recognition of other portion packages; "capsule recognition" in this text is used by way of representation for the recognition of suitable portion packages) provides further advantages: Capsule recognition data can be used in particular for logistics and convenience. Thus, for example, one can record how many capsules have been consumed on a machine, and a re-delivery of capsules can be initiated if a documented capsule supply is running out. Furthermore, loyalty programs or the like can be set up, according to which a consumer obtains further capsules at a discount after a certain number of consumed capsules, etc.

Capsule recognition modules, however, have the disadvantage that they are technically complicated and render the extraction devices more expensive.

SUMMARY OF THE INVENTION

It is an object of the present invention to provide an extraction device which at least has some of the advantages of a machine capsule recognition, but which is less complicated and more economical in manufacture than an extraction device with a capsule recognition module for reading out a for example optical code on a portion package.

Drinks preparation machines of the claimed type include a pump for delivering preparation fluid—generally water, possibly with an addition—into a brewing chamber, which receives the portion package, as well as a flow-meter that is arranged on the fluid conduit, which leads via the pump into the brewing chamber, such that directly or indirectly, it can measure a delivery volume of the fluid that is delivered into the brewing chamber. Machine electronics activate the pump and acquire the results of this measurement, in order, for example, to switch off the pump after reaching a defined delivered total delivery volume. According to an aspect of the invention, the electronics are configured to evaluate the measurement data of the flow-meter and from this evaluation to make a differentiation between a first state "brewing with an inserted portion package" and a second state "water throughflow without inserted portion package", in order to detect the presence of a portion package in the brewing chamber.

Vane-wheel flow-meters are often applied as flow-meters in household appliances. Such transfer an impulse to the electronics for each revolution of the impeller. The number of impulses is characteristic of the delivery volume, and the flow rate (volume per unit of time) can then be determined by the control, which also includes a clock, by way of division. The use of such a flow-meter is also an option for the present invention. However, the invention however is not restricted to this type of flow measurement. In contrast, any measuring methods that can be applied for a measurement of the delivered volume or directly of the flow rate can be applied.

The fact that the electronics, thus machine electronics are "configured" to carry out a method as is described in this text means that specific measures are realised at the electronics, so that this method is carried out when respective conditions are met, for example if a drinks preparation process has been activated. It is not therefore sufficient for the electronics to be able to be programmable, in order to carry out the method, but they must be specifically programmed or accordingly configured/set up in another manner (for example by way of applying an ASIC which simultaneously contains the functionality). In many embodiments, the configuration of the electronics is effected via the uploading respective firmware.

If in the present text, the drinks preparation machine is described by way of a method which it carries out, what is always meant is that the machine, in particular the electronics, are configured to carry out the method.

The portion package can be a capsule. It includes a drinks ingredient, for example an extraction material such as coffee powder or tea. The drinks ingredient however can also be or contain an extract or for example milk powder; and further for example water-soluble ingredients such as sugar or another sweetener can also be contained in the portion package.

The electronics, for example, include a portion counter, which, after an activation of a brewing process—for example by way of actuating an actuation button—is only then increased by "1" if the first state (portion package detected) has been determined.

The invention therefore suggests not relating a counter for counting drinks preparations or generally information on the taking-place of a drinks preparation solely to the activation procedure, but indeed to the result of an evaluation. By way of this measure, which per se is quite simple, it is ensured that the information is not adulterated by way of the user being able to also activate an apparent drinks preparation without him having inserted a portion package, for example for preheating a drinks vessel or on account of a mistake. Despite this, the solution is inexpensive and indeed only elements that are normally present in the drinks preparation machine in any case are used.

The evaluation makes use of the fact that the flow resistance through the brewing module, i.e. the ratio of the pressure difference between the inlet side and the outlet side of the brewing module on the one hand and the flow rate (delivery volume per unit of time) on the other hand is dependent on whether a portion package is inserted or not. The throughflow resistance becomes larger if a portion package is present, through package fluid needs to flow. The throughflow resistance is sometimes also called "flow resistance" although its definition is different to that of the flow resistance, to which an object (for example a transport means) is subjected on movement through a fluid.

For example, given an essentially constant pump pressure, the flow rate of the fluid that is delivered by the pump—thus the result of the possibly evaluated measurement by the flow-meter—can be a direct measure of whether a portion package is inserted or not. This is because the throughflow resistance through the brewing module indeed depends on whether a portion package is inserted or not, and the flow resistance through all other sections of the fluid path from the water tank to a pour-out is constant. The pump pressure can generally be assumed as being essentially constant, and even if it should slightly drop for example due to a larger flow rate, this does not change the fact that the flow rate is a measure for the presence or absence of a portion package.

Furthermore, it is otherwise also possible to include measurement data that characterises the pump pressure or the pump power, such as for example the electricity consumption of the pump, in the evaluation.

In a suitable manner, the evaluation uses the fact that the flow rate behaviour is different when a portion package is inserted, than if this were not the case. This can be effected, for example, by way of the flow rate value being compared to a threshold value at a certain point in time or after reaching a defined delivery volume after switching on the pump. If the flow rate lies above the threshold value or it is equal to the threshold value, then no portion package is inserted. Variants, concerning which the flow rate is detected and evaluated over a certain time period or during the delivery of a certain volume (for example after delivering the first x ml until the next y ml are delivered) are conceivable. For example, the time needed to deliver a further y ml after the delivery of a first x ml can be determined and compared to a threshold value, or the difference between the flow rate after the delivery of the first x ml and after the delivery of the further y ml can be formed and compared to a threshold value. Concerning such a procedure, typical values for x [ml] lie between 3 and 7, for example approx. 5, and typical values for y [ml] are between 5 and 24, in particular between 8 and 18, for example approx 12.

It is also possible to examine whether the flow rate as a function of time or of the delivered volume has a characteristics course, i.e. instead of a comparison of absolute values, a comparison of patterns in the development of the flow rate is possible. This, for example, can include the temporal derivative or the derivative according to the delivery volume being acquired and being compared to a defined value or a comparison function depending on the time or the volume. Further methods for detecting characteristic patterns and/or characteristic courses progressing to methods of artificial intelligence are conceivable and are not to be ruled out. For example, methods according to which a data processing unit is fed with a multitude of measurements, together with the detail as to whether such a measurement corresponds to a measurement with or without a portion package, are known. From this, the electronics then determine a differentiation criterion which takes the data into account. Algorithms as well as methods of machine learning which carry out such are already known.

Information as to whether a portion package is inserted or not during the process results as a result of the procedure according to the invention. In particular, this can be used for the counting of drinks preparations (in particular brewings). However, the information can also be of use to the machine control. For example, given an irregularity (blocking or the like), which is subsequent to the delivery of the fluid, the measures that are applied by the machine control can be dependent on whether a portion package was present or not in the brewing chamber during the preceding fluid delivery.

In particular, the electronics of the drinks preparation machine can include a communication module. The results of the detection of a portion package in accordance with the invention can be transferred to an external device and/or to a network via this communication module. Specifically, the results of a counting of drinks preparations can be used.

For example, an inventory management can be effected according to a first possibility with regard to this. This can be effected by the drinks preparation machine, possibly the external device (for example a mobile telephone, in particular smartphone) and/or possibly a service which is in connection with the machine via the network, for example a server of the provider of the portion packages. For this purpose, the machine or the device or the service includes inventory information which can be provided actively by the user and/or be based on electronically executed orders or the like. The counting of drinks preparations can be used in order to constantly update the inventory and for example when required, to initiate measures such as the automatic re-delivery of portion packages or information to the user that the supply is running out.

According to a further possibility, the counting with the transfer to a service or to an external device can also be used for promotion and/or customer relation purposes, for example for loyalty programs etc.

Accordingly, the present invention, apart from a drinks preparation machine, also includes a system which, apart from the machine, also includes software, which can be installed externally, for example on a mobile telephone and/or a computer, for example a server of a provider of portion packages and permits an accounting on the number of drinks preparations which have been effectively carried out on the machine.

A counting of the executed drinks preparations can also be of use in the machine itself, for example for maintenance purposes, information of cleaning or descaling cycles that are to be carried out, etc.

Apart from the drinks preparation machine, a method for operating a drinks preparation machine is also the subject-matter of the present invention.

BRIEF DESCRIPTION OF THE DRAWINGS

Embodiment examples of the invention are described hereinafter by way of figures. In the figures, equal reference numerals denote the same or analogous elements. There are shown in.

DETAILED DESCRIPTION OF THE INVENTION

Figure 1:
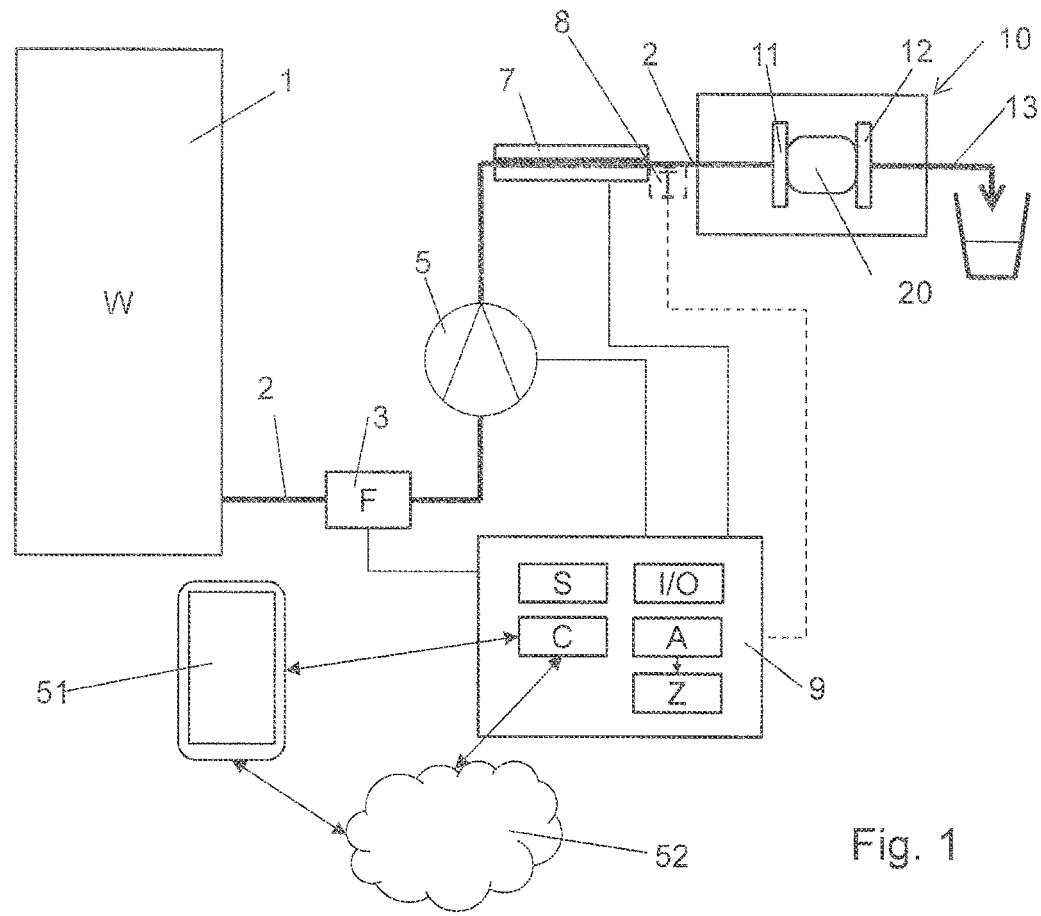
FIG. 1 a schematic diagram of a drinks preparation machine, in particular of a coffee machine.

FIG. 1 shows a schematic drawing of a drinks preparation machine, in particular of a coffee machine. The water feed includes a water tank 1 and a fluid conduit, specifically a feed conduit 2 from the water tank to a brewing module 10. The water is delivered by a pump 5 and flows through a water heater—here drawn as a continuous flow heater 7—before it flows into the brewing module. A flow-meter 3 is arranged upstream of the pump and measures the flow rate of water through the feed conduit and, since the feed conduit 2 does not branch downstream of the flow-meter, hence also measures the fluid flow into the brewing module 10. With a flow-meter of the type "positive displacement flow-meter", such as for example a vane-type flow-meter, such a measurement is effected by way of volume units being counted and—for example in the machine electronics, see below, or in its own electronics—a flow rate being determined by way of the division of the volume units by a time unit.

The arrangement of the flow-meter upstream of the pump has the advantage that the flow-meter is not arranged in the region that is under pressure and also not in the hot region. However, given a suitable design of the flow-meter, an arrangement downstream of the pump in the flow direction or even downstream of the water heater or in the water heater is not to be ruled out a priori. The integration of the flow-meter into the pump is also an option. At all events, it should be arranged such that the flow rate, which is measured by it (directly or for example, given the mentioned vane-type flow-meter, indirectly via an evaluation by the electronics), permits the determining of the fluid flow into the brewing chamber, which is formed given a closed brewing module and which possibly contains the inserted capsule 20. The fluid quantity that flows per unit of time, represented for example as a volume or mass per unit of time, is denoted as the flow rate (at the location of the flow-meter) or fluid flow (into the brewing chamber).

As is known per se, the brewing module includes an injector 11 for introducing water into a portion capsule 20, as well as a discharge device 12 (or extraction device) for leading the fluid out of the capsule 20 into a pour-out 13.

The machine includes electronics 9, which, apart from a control S for the machine and an optional communication module C and an input unit or optionally input/output unit I/O, also forms an evaluation unit A. These individual functions can be present integrated into separate modules that are at least partly in communication connection with one another, or in a common data processing and input/output unit. The elements such as the input/output unit, which can include buttons or the like and/or a touch-sensitive screen not explained in more detail here since they are known for drinks preparation machines and are not the subject-matter of the present invention.

The electronics 9 activate the pump 5 and possibly also the water heater. The flow rate values, which are measured by the flow-meter 3, as well as possibly the temperature values, which are determined by an optional temperature sensor 8 serve as input variables for the control.

Such a temperature sensor 8 as is drawn can be arranged in contact with the feed conduit 2 subsequent to the water heater, in the water heater itself or on the water heater. The control can be configured such that it forms a control loop for the temperature, by way of the water heater being controlled such that the temperature which is measured by the temperature sensor 8 always moves within a certain window. The inclusion of other measurement values, specifically the measured flow rate is also possible for the closed-loop control of the temperature.

Further input variables can be led to the electronics 9 and influence the control, amongst these parameters and/or programmings which are inputted by the user.

Figure 2:
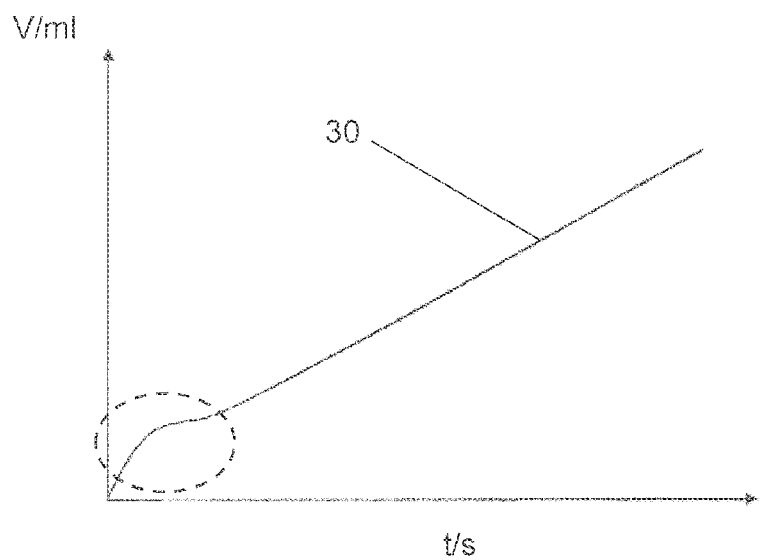
FIG. 2 a delivery volume—time diagram.

The delivery volume V as a function of time is plotted by way of example in FIG. 2 (reference numeral 30). It is particularly at the beginning of the process, in FIG. 2 in the region that is encircled in a dashed manner, that a characteristic course that is used for the subsequently described evaluation results.

Figure 3:
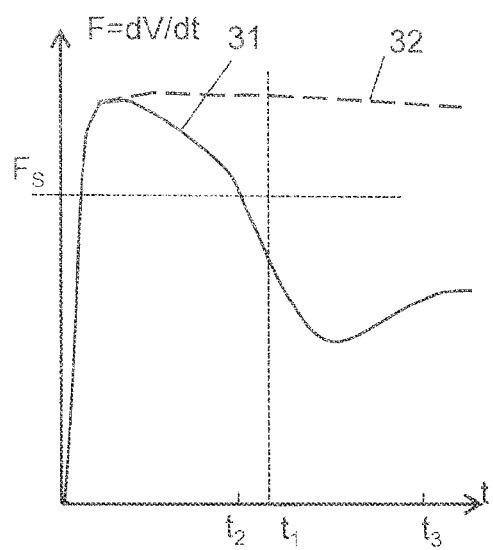
FIG. 3 a flow rate—time diagram.

The result of the flow rate measurement is used for the evaluation. As is schematically drawn in FIG. 3, the flow rate 31 dV/dt, i.e. the delivery volume V per unit of time, given a constant pump power, as a function of time t can drop shortly after switching on the pump, since the capsule (or other portion package) fills with fluid and forms a throughflow resistance. The precise course and the extent of the flow rate reduction can depend on the capsule, in particular the contents (grinding fineness, filled quantity etc) as well as the capsule material, the nature of the capsule and the nature of the brewing module which receives the capsule; a significant reduction will however always be ascertained.

If no capsule is inserted, then the flow rate in contrast remains roughly constant (graph 32) or as a function of time only drops later and to a less pronounced manner, since indeed no flow resistance is generated due to extraction material (or possibly extract), which is present in the portion package.

This can be used for the evaluation. One possibility is to examine, after for example an empirically determined time $t_1$, whether the flow rate is above or below a threshold value $F_S$ which for example is likewise determined empirically: if the flow rate is below the threshold value, a capsule is present.

As in all embodiments described in this text, given a determined presence of a capsule (or other portion package) during the process, the count value. which is acquired in a counter Z (FIG. 1), is increased by one. If not, no capsule is counted.

When required, this method can be made even more robust by way of a flow rate that is integrated over a time span $[t_2, t_3]$—i.e. the delivery volume that is delivered between two points in time $t_2$ and $t_3$—or equivalently an average value, for example the arithmetic mean, from several flow rate measurements as a comparative variable being used instead of the flow rate at a certain point in time $t_1$. If this comparative variable lies above a certain threshold value, then no capsule is inserted. Another possibility is for a flow rate difference, i.e. a flow rate reduction between two points in time, or a temporal derivative of the flow rate being evaluated. Combinations are also possible.

In some drinks preparation machines, there is a certain temporal lack of definition, which could originate from the tolerances in the capsule characteristics and which leads to the precise point in time at which the capsule begins to fill with fluid not being known during the capsule opening phase (the capsule is pierced for example, in order to introduce the water).

Figure 4:
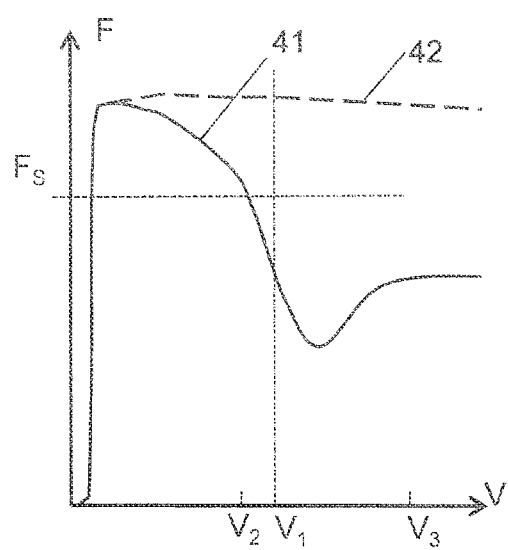
FIG. 4 a flow rate—delivery volume diagram.

For such situations, as an alternative to the evaluation as a function of time, it is suggested to evaluate the flow rate as a function of the already delivered volume V (delivery volume), which is sketched in FIG. 4. The flow rate 41 after reaching a certain value also markedly reduces as a function of the delivered volume when a capsule is inserted. This is not the case without an inserted capsule (graph 42).

With this alternative too, there is firstly the possibility of comparing the flow rate, which is measured after the delivery of a certain volume $V_1$, with a threshold value $F_S$: if the flow rate is smaller than the threshold value, a capsule is inserted, otherwise not. Depending on the portion package—which as a coffee capsule will generally have a filling quantity of between 6 g and 10 g—the volume $V_1$ at which a particularly good differentiation is made can be at a fixed value between approx. 12 ml and approx 25 ml, in particular at a value between 15 ml and 20 ml.

The variants described above for the evaluation as a function of time also exist for the evaluation as a function of the volume. For example, one can evaluate how much time passes between the point in time at which a defined volume $V_2$ has been reached and the point in time at which another defined volume $V_3$ has been reached, or a flow rate difference or a temporal derivative or a derivative $\partial F/\partial V$ of the flow rate according to the delivery volume can be compared.

The procedure according to the present invention is particularly advantageous in combination with a possibility for the drinks preparation machine of exchanging data with another device and/or a network, i.e. with a communication module of the electronics, which also becomes clear from the subsequent explanations.

The results of the counting which is based on the evaluation can be used for example as follows:

Firstly, the drinks preparation machine can use the counting of the executed drinks preparations for maintenance purposes. For this, one can for example envisage the user being prompted into carrying out a cleaning and/or a descaling or the like after a certain number of counted drinks preparations. The number of drinks preparations can also be read out and provide a service technician with indications that a certain part is to be exchanged, etc.

Secondly, the counting of the drinks preparations can be used for a monitoring of the inventory of portion packages. For this, according to a first option data on the inventory is read into the drinks preparation machine, for example after a purchase. This can be effected automatically if the purchase has been carried out with electronic aids, for example as an online order. The result of the counting then permits a monitoring of the inventory and the drinks preparation machine can for example inform the user when the inventory is in danger of running out and/or can immediately provide an ordering possibility. For this purpose, for example a dedicated key can be present on the machine, said key activating an ordering of a defined basket of portion packages, or such an order can be effected via a menu input.

According to a second option, such an inventory management is effected outside the drinks preparation machine, for example in an external device 51 (in particular mobile telephone) and/or via a network 52, on a server or in the cloud. For this purpose, with each drinks preparation, at regular intervals or given certain events, the drinks preparation machine can transfer the number of executed drinks preparations to the external device or to the network. Depending on the settings which have been carried out by the user, a re-ordering can be activated automatically, or the user can be made aware of the low stock and a possibility of ordering, in a suitable manner—optionally also via the drinks preparation machine.

Thirdly, the counting can also be used for promotion and/or customer relation purposes. For example, the machine can transfer the information in a direct manner and/or via an external device 51 to a network 52, according to which again a certain number of drinks preparations have been carried out. This can then activate the dispatch of a loyalty gift, an offer or the like to the user, depending on the carried out settings in a direct manner, depending on further events, etc.

The invention claimed is:

1. A drinks preparation machine, comprising a brewing module for forming a brewing chamber which is designed for receiving a portion package with a drinks substance, a pump for delivering a preparation fluid through a fluid conduit into the brewing chamber, a flow-meter which is arranged on the fluid conduit, as well as machine electronics for controlling the pump and for acquiring measurement data of the flow-meter, wherein the machine electronics are configured to evaluate the measurement data of the flow-meter and from this evaluation to make a differentiation between a first state which corresponds to a state with the portion package inserted into the brewing chamber, and a second state which corresponds to a state without the portion package inserted into the brewing chamber, in order to detect a presence or an absence of the portion package in the brewing chamber.

2. The drinks preparation machine according to claim 1, wherein the machine electronics comprise a counter of drinks preparations, which after activation of a drinks preparation process is increased by a value only if the first state has been determined.

3. The drinks preparation machine according to claim 1, wherein the machine electronics are configured to compare measured flow rate with a threshold value, and to conclude the first state if the measured flow rate lies below the threshold value and the second state if the measured flow rate lies above the threshold value or corresponds to the threshold value.

4. The drinks preparation machine according to claim 3, wherein the measured flow rate, which is compared to the threshold value, is measured in a predefined interval following activation of a drinks preparation process.

5. The drinks preparation machine according to claim 3, wherein a flow rate which is integrated over a time interval is used for the comparison with the threshold value.

6. The drinks preparation machine according to claim 1, wherein the electronics comprise a communication module, in order to exchange data with a network and/or directly with an external device.

7. The drinks preparation machine according to claim 6, wherein the machine electronics are configured to transfer a result of evaluation to the external device or to a service which can be reached via the network.

8. A system, comprising the drinks preparation machine according to claim 6, as well as software that can be installed on an external device which can be brought into communication connection with the drinks preparation machine in a direct manner, or on an external computer which can be brought into communication connection with the drinks preparation machine via the network, said software enabling said external device or said external computer to keep data on a number of drinks preparations carried out by the drinks preparation machine.

9. A method for operating a drinks preparation machine, the method comprising the steps of:
providing the drinks preparation machine of claim 1;
feeding water to the brewing chamber by way of the pump;
measuring a flow rate of the water;
analyzing the measured flow rate and thereby differentiating between a first state corresponding to a state with the portion package inserted into the brewing chamber and a second state corresponding to a state without the portion package inserted into the brewing chamber, in order to detect presence or absence of the portion package in the brewing chamber.

10. The drinks preparation machine according to claim 2, wherein the machine electronics are configured to compare a measured flow rate with a threshold value, and to conclude the first state if the measured flow rate lies below the threshold value and the second state if the measured flow rate lies above the threshold value or corresponds to the threshold value.

11. The drinks preparation machine according to claim 10, wherein the measured flow rate, which is compared to the threshold value, is measured in a predefined temporal interval following activation of a drinks preparation process.

\* \* \* \* \*